(12) United States Patent
Kitada

(10) Patent No.: US 10,634,245 B2
(45) Date of Patent: Apr. 28, 2020

(54) SHIFT DEVICE FOR BOAT

(71) Applicant: NHK SPRING CO., LTD., Yokohama-shi, Kanagawa (JP)

(72) Inventor: Kentaro Kitada, Yokohama (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 305 days.

(21) Appl. No.: 15/868,082

(22) Filed: Jan. 11, 2018

(65) Prior Publication Data

US 2018/0209537 A1 Jul. 26, 2018

(30) Foreign Application Priority Data

Jan. 23, 2017 (JP) ................................ 2017-009651

(51) Int. Cl.
| | |
|---|---|
| *F16H 61/24* | (2006.01) |
| *B63H 20/14* | (2006.01) |
| *F16H 59/04* | (2006.01) |
| *B63H 21/21* | (2006.01) |
| *F16H 59/02* | (2006.01) |

(52) U.S. Cl.
CPC .............. *F16H 61/24* (2013.01); *B63H 20/14* (2013.01); *B63H 21/213* (2013.01); *F16H 59/02* (2013.01); *F16H 59/04* (2013.01); *B63B 2758/00* (2013.01); *F16H 2059/0256* (2013.01); *F16H 2059/047* (2013.01); *F16H 2061/243* (2013.01); *Y02T 10/76* (2013.01)

(58) Field of Classification Search
CPC .... B63H 21/21; B63H 21/213; B63H 21/216; F16H 61/18; F16H 2061/185; F16H 61/24; F16H 2061/243; F16H 59/02; F16H 2059/0256; F16H 59/04; F16H 2059/047
USPC ......................... 74/473.22, 473.25, 473.28
See application file for complete search history.

(56) References Cited

U.S. PATENT DOCUMENTS

| | | | | |
|---|---|---|---|---|
| 3,866,488 | A * | 2/1975 | Nakata | F16H 59/042 |
| | | | | 74/473.26 |
| 3,934,485 | A * | 1/1976 | Ratliff | F16H 59/045 |
| | | | | 74/473.33 |
| 4,365,522 | A * | 12/1982 | Kubota | F16H 59/10 |
| | | | | 192/218 |
| 4,581,951 | A * | 4/1986 | Watson | F16H 59/042 |
| | | | | 74/473.3 |
| 4,638,678 | A * | 1/1987 | Gorman | F16H 61/18 |
| | | | | 74/473.22 |

(Continued)

FOREIGN PATENT DOCUMENTS

| | | | | |
|---|---|---|---|---|
| DE | 4110555 | A1 * | 10/1992 | ............. F16H 63/20 |
| JP | 2005297785 | A | 10/2005 | |

*Primary Examiner* — Ajay Vasudeva
(74) *Attorney, Agent, or Firm* — Holtz, Holtz & Volek PC

(57) ABSTRACT

A shift device for a boat includes a lever which can be operated about a predetermined axis, and a lever operation suppression mechanism which suppresses an operation of the lever. The lever operation suppression mechanism includes a load applying portions (a first load applying portion and a second load applying portion) which apply different loads to the lever in a first operation period of operating the lever between a neutral position of the lever and a first position corresponding to a forward movement of the boat, and in a second operation period of operating the lever between the neutral position and a second position corresponding to a backward movement of the boat.

9 Claims, 7 Drawing Sheets

(56) References Cited

U.S. PATENT DOCUMENTS

| | | | | |
|---|---|---|---|---|
| 4,721,004 A | * | 1/1988 | Ward | F16H 61/18 |
| | | | | 74/473.21 |
| 5,979,262 A | * | 11/1999 | Doelling | F16H 61/18 |
| | | | | 74/473.21 |
| 7,836,787 B2 | | 11/2010 | Oguma | |
| 9,828,080 B1 | * | 11/2017 | Belter | B63H 21/213 |

* cited by examiner

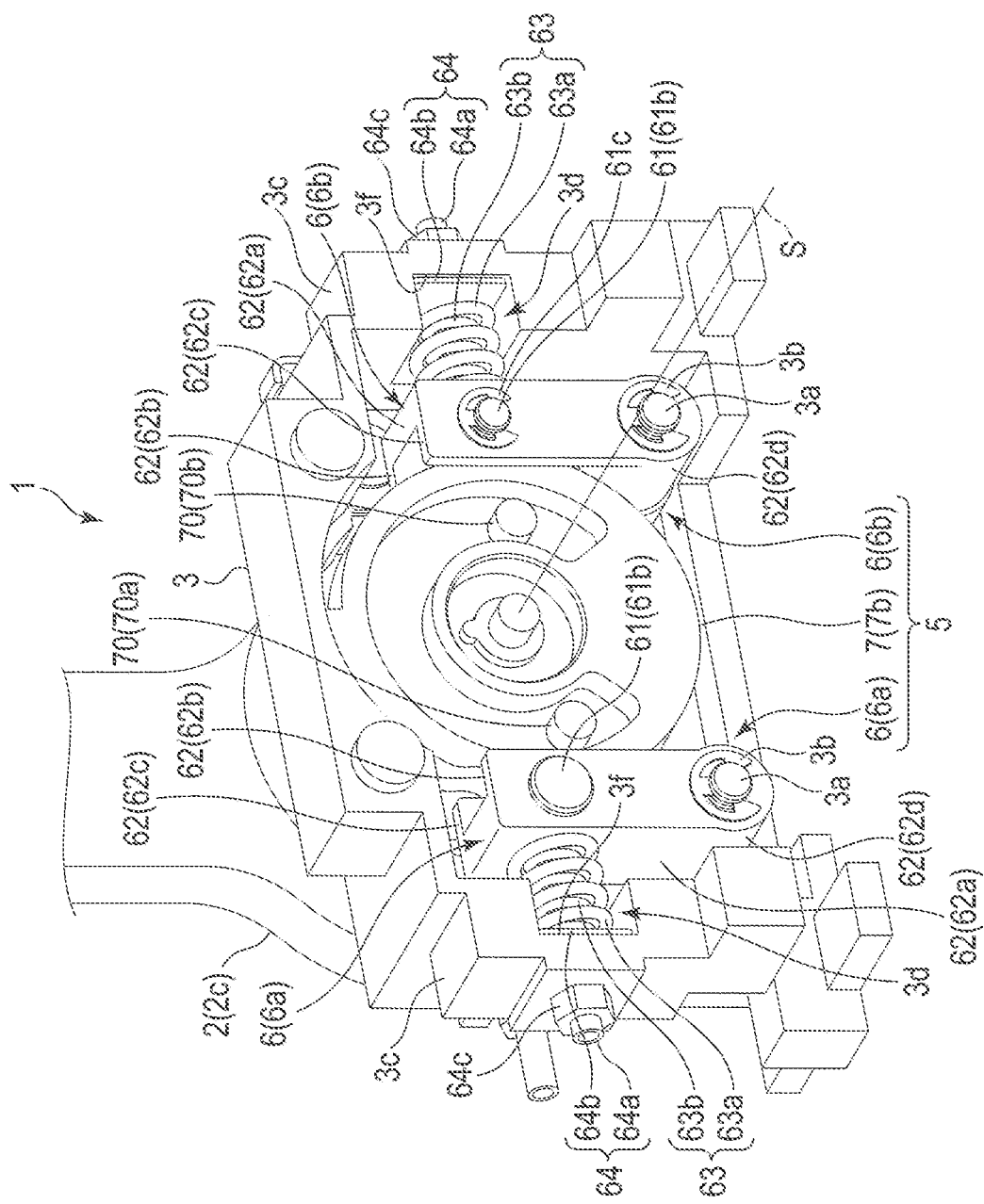
F I G. 4

SHIFT DEVICE FOR BOAT

CROSS-REFERENCE TO RELATED APPLICATIONS

This application is based upon and claims the benefit of priority from prior Japanese Patent Application No. 2017-009651, filed Jan. 23, 2017, the entire contents of which are incorporated herein by reference.

BACKGROUND OF THE INVENTION

1. Field of the Invention

The present invention relates to a shift device for a boat which performs shift (gear change) of an outboard motor via a shift actuator by operating a lever.

2. Description of the Related Art

A shift device for a boat (hereinafter referred to as a shift device for short as appropriate) for performing a shifting (gear change) operation of an outboard motor remotely is known (see JP 2005-297785A [Patent Literature 1]). For example, as disclosed in Patent Literature 1, in a case of an electrically-operated type device which electrically performs the shift, the shift device is disposed near a cockpit, for example, and is electrically connected to an electronic control unit of the outboard motor. When a lever is operated, the shift device transmits a signal of the operation state (an angle of operation, for example) to the electronic control unit. A shift control device shifts a propeller shaft of the outboard motor to one of Forward (F), Neutral (N), and Reverse (R), based on the received signal.

In such a shift device, when the lever is to be returned from a forward position to a neutral position, for example, if the lever is operated abruptly far to a reverse position, a problem as described below occurs. That is, in the outboard motor, despite the state where the number of revolutions of a gear of the propeller shaft is high, a clutch of a forward/reverse gear is actuated abruptly. As a result, a trouble such as breaking of a gear mechanism may occur.

Thus, it is necessary to prevent the lever from being operated from the forward position to the reverse position abruptly by the inertia, etc. For example, suppressing such an abrupt operation of the lever by electrical control is considered. However, performing the control in this way tends to increase the cost, and it has been desired to suppress the abrupt lever control with an easier mechanism.

For example, measures that can be taken are to provide a lock mechanism in the lever, and disable the lever operation from the neutral position to the forward position or the reverse position unless the lock is disengaged. However, with such the lock mechanism, the lock must be disengaged every time the lever is operated, and so the operability is not good. Also, the lock mechanism must be provided in the lever, and so the size of the lever is increased accordingly.

Alternatively, other measures that can be taken are to provide a braking mechanism in the lever, and increase the control force throughout the operation range of the lever (the entire movable range). However, with such a braking mechanism, not only the operability of the lever in the entire movable range is deteriorated, but a steering (operating) feel when the lever is operated to the forward/reverse position and the neutral position is also not satisfactory.

BRIEF SUMMARY OF THE INVENTION

The present invention has been conceived in consideration of the above, and the object of the present invention is to provide a shift device for a boat capable of suppressing an abrupt operation of a lever with a simpler mechanism than in the past without deteriorating die operability of the lever.

A shift device for a boat according to one embodiment comprises a lever which can be operated about a predetermined axis, and a lever operation suppression mechanism which suppresses an operation of the lever, in order to perform a shifting operation of an outboard motor. The lever operation suppression mechanism includes a load applying portion which applies different loads to the lever in a first operation period of operating the lever between a neutral position of the lever and a first position corresponding to a forward movement of the boat, and in a second operation period of operating the lever between the neutral position and a second position corresponding to a backward movement of the boat.

According to this embodiment, suppressing an abrupt operation of the lever can be achieved with a simpler mechanism than in the past without deteriorating the operability of the lever.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a perspective view showing the entirety of the lever operation suppression mechanism of the shift device according to one embodiment of the present invention.

DETAILED DESCRIPTION OF THE INVENTION

A shift device for a boat according to one embodiment of the present invention (hereinafter referred to as a shift device for short as appropriate) will be described with reference to FIGS. 1 to 7.

Figure 1:
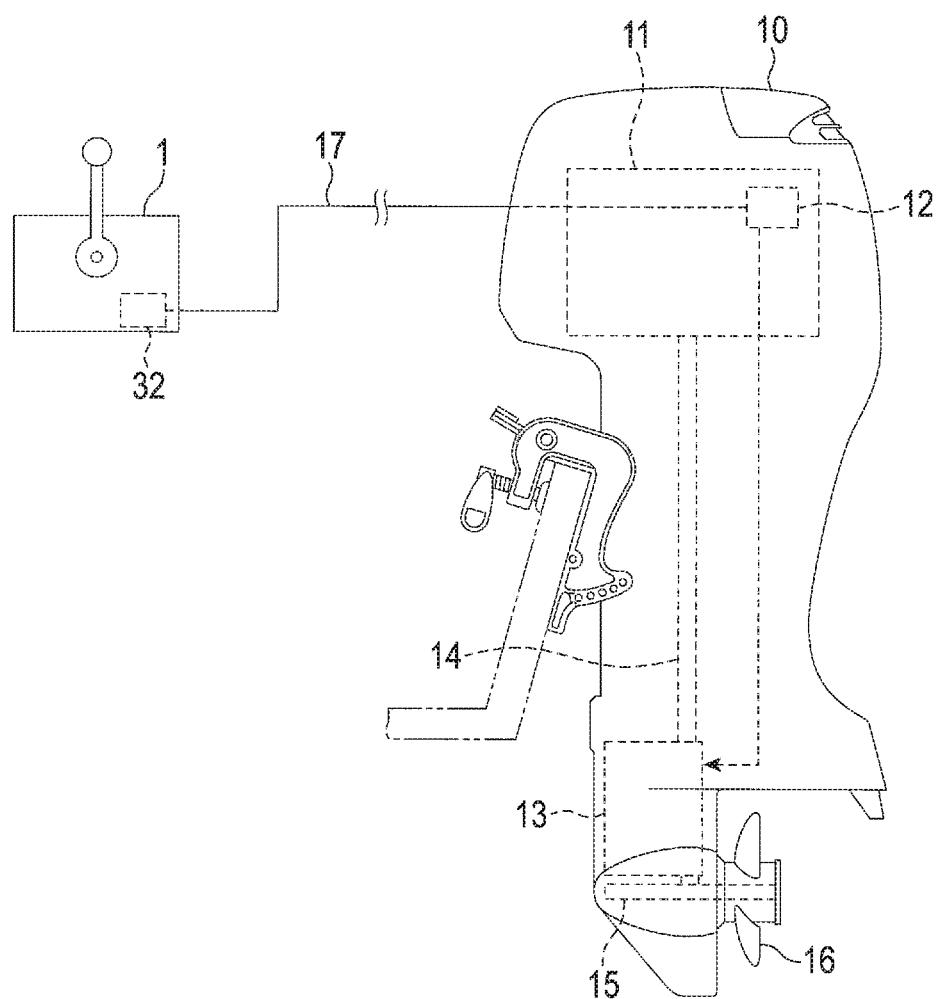
FIG. 1 is a schematic diagram showing a system of a shifting operation of an outboard motor performed by a shift device according to one embodiment of the present invention.

A shift device 1 according to the present embodiment is an apparatus for performing a shifting (gear change) operation of an outboard motor 10 remotely. FIG. 1 shows an outline system of the shifting operation of the outboard motor 10 performed by the shift device 1. The outboard motor 10 is comprised of an internal-combustion engine (engine) 11, an electronic control unit (ECU) 12, a shift actuator 13, etc. The engine 11 is arranged such that a crankshaft (not illustrated) is disposed in a vertical direction (i.e., top-to-bottom direction in FIG. 1). The crankshaft is connected to a drive shaft 14. The drive shaft 14 is connected to the shift actuator 13.

The electronic control unit 12 controls the operation of the shift actuator 13. The shift actuator 13 shifts to (i.e., changes a gear to) one of Forward (F), Neutral (N), and Reverse (R), and transmits an output (a driving force) of the engine 11 to a propeller shaft 15. A propeller 16 is attached to the propeller shaft 15. Note that while a source of power of the propeller shaft 15 is assumed as the internal-combustion engine (engine) 11 in the present embodiment, an electric motor, for example, may be mounted on the outboard motor 10 as the source of power.

The shift device 1 is arranged near a cockpit of a boat, for example, and a control board 32 is electrically connected to the electronic control unit 12 of the outboard motor 10 via a cable 17, etc. As one example, in the present embodiment, since the shift device 1 is of an electrically-operated type which electrically performs the shift (gear change) of the outboard motor 10, the shift device 1 is electrically connected to the electronic control unit 12. Alternatively, the shift device 1 may be of a mechanical type which performs the shift (gear change) of the outboard motor 10 by a wire or the like.

Figure 2:
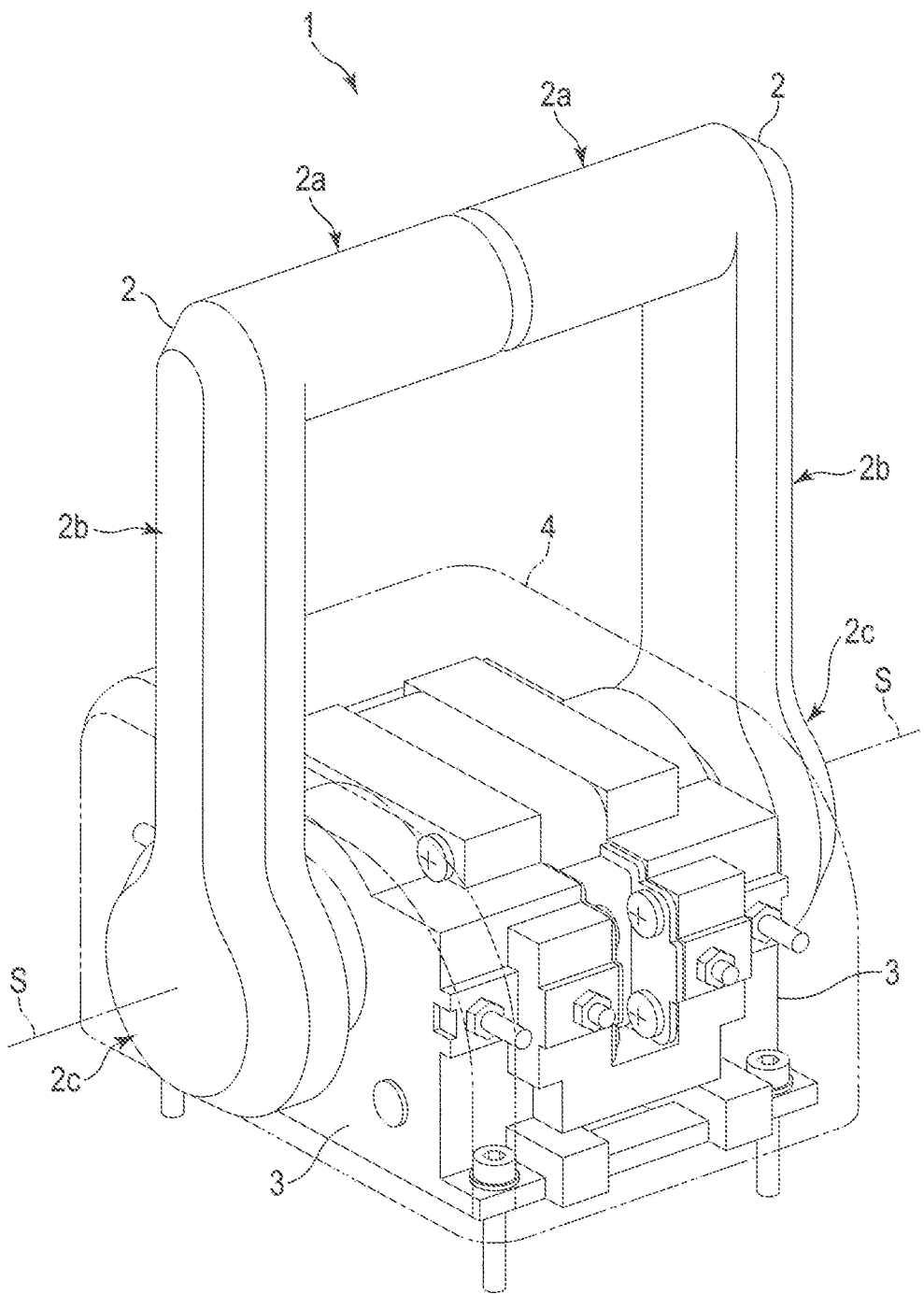
FIG. 2 is a perspective view showing an appearance of the shift device according to one embodiment of the present invention.

FIG. 2 shows an appearance of the shift device 1. As shown in FIG. 2, the shift device 1 comprises a lever 2, a housing 3 which supports the lever 2, and a case 4 which accommodates the housing 3. As one example, in the present embodiment, the shift device 1 comprises a pair of levers 2 and a pair of housings 3. The number of levers 2 corresponds to the number of systems required for the shifting operation of the outboard motor 10 (for example, the number of outboard motors 10 or propeller shafts 15). Each of the levers 2 is supported by a different housing 3 separately. Each of the housings 3 supporting the lever 2 is assembled into one unit and is accommodated into the case 4. The number of housings 3 may be made to correspond to the number of levers 2, but is not necessary made to conform to the number of levers 2. The case 4 in which the lever 2 and the housing 3 are accommodated is fixed near the cockpit, for example. The material of the lever 2, the housing 3, and the case 4 is not particularly limited. As one example, in the present embodiment, the lever 2 and the housing 3 are made of aluminum, and the case 4 is made of resin.

The lever 2 is a member which is operated by an operator when performing the shift of the outboard motor 10. The lever 2 includes a grip portion 2a, a connection portion 2b, and a base end portion 2c. The grip portion 2a is a portion which is held by the operator at the time of the shifting operation. The connection portion 2b is contiguous with the grip portion 2a, and is a portion which connects the grip portion 2a to the base end portion 2c. The base end portion 2c is a portion supported by the housing 3. As one example, in the present embodiment, although the connection portion 2b is made contiguous with an end of the grip portion 2a, a portion with which the connection port on 2b is made contiguous is not particularly limited. Alternatively, a lever structure omitting the grip portion 2a may be employed.

The lever 2 can be operated (rotated) about a predetermined axis S in a state in which the base end portion 2c is supported by the housing 3. A direction in which the lever 2 is operated (rotated) is parallel to a longitudinal direction (i.e., a direction along fore and aft) of the boat. For example, by pushing the grip portion 2a toward the bow of the boat, the base end portion 2c performs normal rotation about axis S, and by pulling the grip portion 2a toward the stern, the base end portion 2c performs reverse rotation about axis S. That is, the lever 2 is rotated in a direction of normal rotation or a direction of reverse rotation about axis S from a neutral position, which is the reference position. As one example, in the present embodiment, a direction in which the lever 2 performs the normal rotation from the neutral position corresponds to the boat-forward-moving side, and a direction in which the lever 2 performs the reverse rotation corresponds to the boat-backward-moving side.

A movable range (an operable range) of the lever 2 is restricted to a predetermined range (a predetermined angular range about axis S) by a stopper mechanism. The stopper mechanism includes a movable pin 70 (FIGS. 3 to 7) provided on a gear portion 7b of a drive gear 7 which will be described later, and a stationary pin (not illustrated) which is immovable relative to the housing 3, and makes the movable pin 70 interfere with the stationary pin. The movable pin 70 and the stationary pin are arranged at two end portions of the movable range of the lever 2, respectively. In this way, the lever 2 is configured to be operable (rotatable) only in the movable range.

For example, in FIGS. 3 to 7, a movable pin 70a is arranged to correspond to an end portion of the forward movement side of the movable range of the lever 2, and a movable pin 70b is arranged to correspond to an end portion of the backward movement side of the movable range of the lever 2, so that these movable pins can interfere with the stationary pins arranged at the corresponding end portions, respectively. If the lever 2 is to be operated beyond the end portion of the forward movement side or the backward movement side of the movable range, the movable pin 70a interferes with the stationary pin on the forward movement side, or the movable pin 70b interferes with the stationary pin on the backward movement side to prevent the lever 2 from being operated further.

Figure 3:
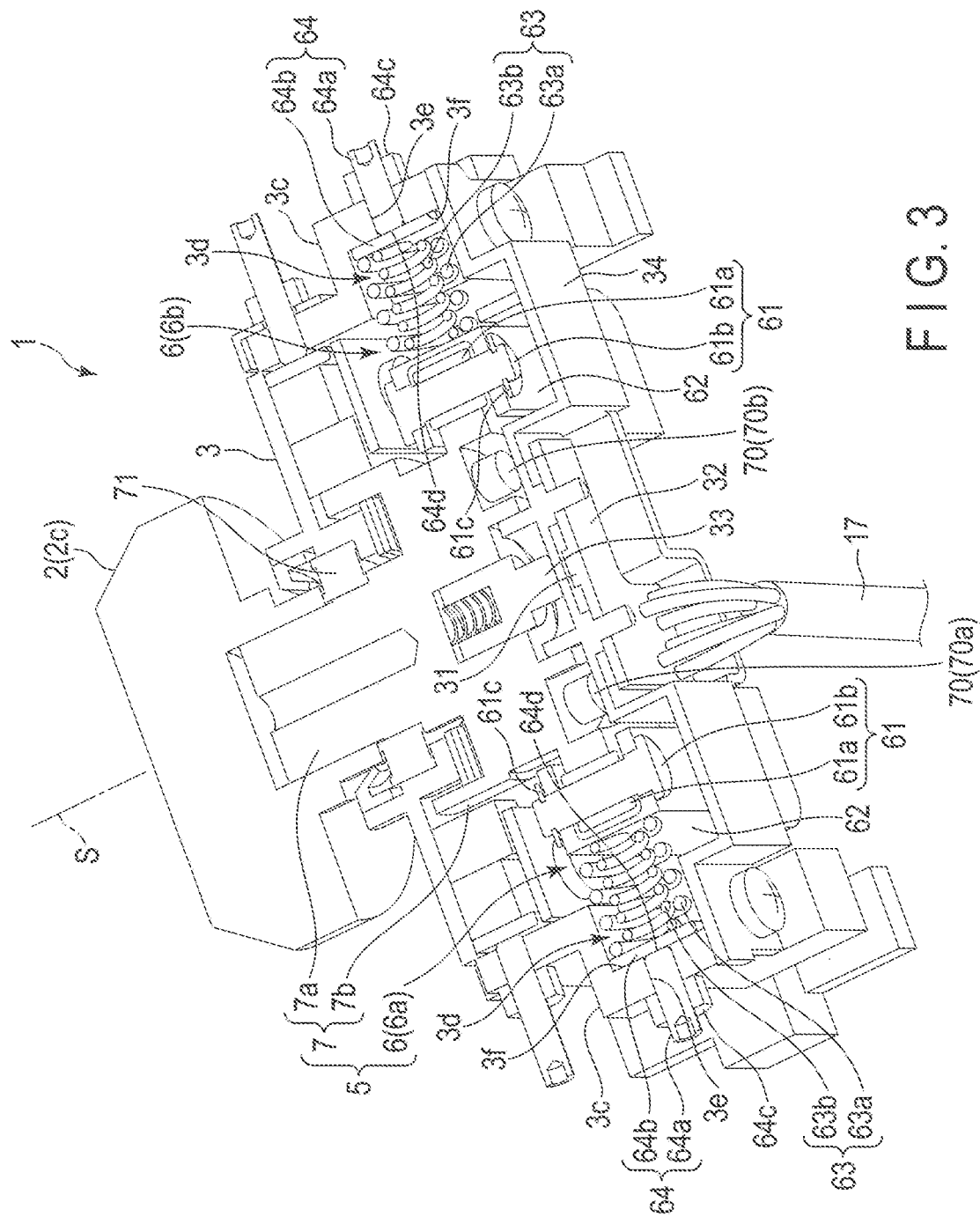
FIG. 3 is a view showing a lever operation suppression mechanism of the shift device according to one embodiment of the present invention in horizontal cross section.

The operation state of the lever 2, such as an operation angle about axis S, is successively detected by a magnetic sensor (a Hall device) 31. FIG. 3 shows a part of the shift device 1 in horizontal cross section. As shown in FIG. 3, the magnetic sensor (Hall device) 31 is provided on a control board 32 to be opposed to a magnet 33. The magnet 33 is mounted on the drive gear 7 to be described later, and rotates together with the lever 2. The magnetic sensor 31 detects a magnetic flux fluctuation when the magnet 33 is rotated, and detects an operation angle of the lever 2. Further, the magnetic sensor 31 transmits a signal corresponding to a detection result to the electronic control unit 12 via the cable 17. The control board 32 is held in a board box 34 fixed to the housing 3.

Consequently, by performing the normal rotation of the lever 2 from the neutral position, the gear can be changed to Forward (F) in the shift actuator 13. Similarly, by performing the reverse rotation of the lever 2 from the neutral position, the gear can be changed to Reverse (R). Further, by returning the lever 2 to the neutral position, the gear can be changed to Neutral (N).

In this way, in the shift device 1, the lever 2 can be operated (rotated) in the boat-forward-moving side or the boat-backward-moving side from the neutral position. Meanwhile, the shift device 1 comprises a lever operation suppression mechanism which suppresses the operation (rotation) of the lever 2. The lever operation suppression mechanism will be described below.

Figure 5:
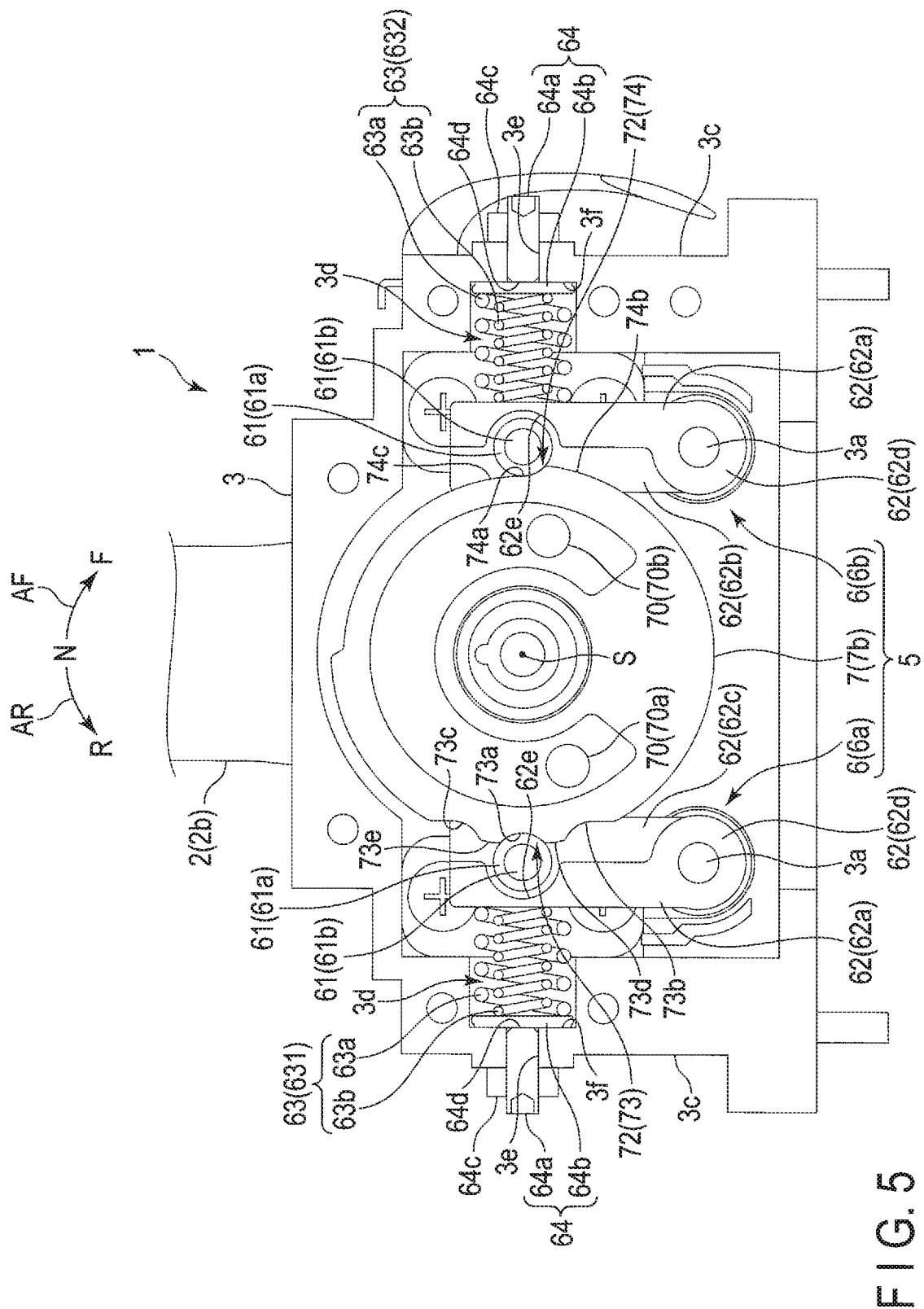
FIG. 5 is a view showing the lever operation suppression mechanism of the shift device according to one embodiment of the present invention in an orthogonal cross section of a rotation axis of a lever (i.e., a view showing the state of the lever operation suppression mechanism in which the lever is positioned at a neutral position).

Each of FIGS. 3 to 5 shows a lever operation suppression mechanism 5. FIG. 3 is a horizontal sectional view of the lever operation suppression mechanism 5. FIG. 4 is a perspective view showing the entirety of the lever operation suppression mechanism 5. FIG. 5 is an orthogonal sectional view of the lever operation suppression mechanism 5 in a direction of axis S.

The lever operation suppression mechanism 5 is structured by including a load applying portion 6, and the drive gear 7 which rotates in conjunction with the operation of the lever 2. The lever operation suppression mechanism 5 applies a load from the load applying portion 6 to the lever 2 through the drive gear 7, thereby suppressing an operation of the lever 2. The load applying portion 6 applies loads different from each other to the lever 2 in two different operation periods for the lever 2.

Of the two operation periods, a first operation period is the operation period (hereinafter referred to as a forward operation period) of the lever 2 in a range between the neutral position of the lever 2 and a first position corresponding to the forward movement of the boat (hereinafter referred to as a forward position). When the lever 2 is operated in the direction of normal rotation from the neutral position beyond the forward position, the gear is changed to Forward (F) in the shift actuator 13. Of the two operation periods, a second operation period is the operation period (hereinafter referred to as a reverse operation period) of the lever 2 in a range between the neutral position of the lever 2 and a second position corresponding to the backward movement of the boat (hereinafter referred to as a reverse position). When the lever 2 is rotated in the direction of reverse rotation from the neutral position beyond the reverse position, the gear is changed to Reverse (R) in the shift actuator 13. Note that the position of the lever 2 shown in FIGS. 3 to 5 corresponds to the neutral position.

In the present embodiment, in the reverse operation period, the load applying portion 6 applies a load, which is greater than that applied in the forward operation period of the lever 2, to the lever 2. In this way, the operation of the lever 2 during the reverse operation period is suppressed. More specifically, according to the load applying portion 6, the operation of the lever 2 in the reverse operation period can be made to require more force than in the forward operation period. Accordingly, it is possible to prevent the lever 2 from being operated from the forward position to the reverse position abruptly passing through the neutral position.

The load applying portion 6 is structured by including a first load applying portion 6a and a second load applying portion 6b. The first load applying portion 6a and the second load applying portion 6b are arranged symmetric with respect to axis S. More specifically, the first load applying portion 6a is disposed on the stern side, and the second load applying portion 6b is disposed on the bow side.

The first load applying portion 6a applies a load to the lever 2 in the forward operation period and the reverse operation period. In contrast, the second load applying portion 6b applies a load to the lever 2 in the reverse operation period. Consequently, in the forward operation period, a load is applied to the lever 2 from the first load applying portion 6a. Meanwhile, in the reverse operation period, a load is applied to the lever 2 not only from the first load applying portion 6a, but also from the second load applying portion 6b. Accordingly, load greater than that of the forward operation period can be applied to the lever 2 in the reverse operation period.

Each of the first load applying portion 6a and the second load applying portion 6b is structured by including a rotor 61, a support body 62, and an elastic body 63.

The rotor 61 contacts the drive gear 7, and rotates together with the drive gear 7. The rotor 61 is structured by including a roller 61a having a through-hole in a center, and an axis member (hereinafter referred to as a roller shaft) 61b which is inserted in the roller 61a. The roller shaft 61b includes a cylindrical portion having a diameter slightly smaller than that of the through-hole of the roller 61a. The cylindrical portion of the roller shaft 61b is inserted in the through-hole of the roller 61a. On one end of the cylindrical portion, a head having a diameter greater than that of the through-hole of the roller 61a is provided.

The support body 62 rotatably holds the rotor 61. In this case, the support body 62 fixes the positioning of the roller shaft 61b inserted in the through-hole of the roller 61a. In this way, the roller 61a is made rotatable about the roller shaft 61b with respect to the support body 62. Also, the support body 62 is swingably supported on the housing 3. Consequently, the roller 61a is rotatable with respect to the support body 62, and swingable with respect to the housing 3.

The support body 62 includes a bottom portion 62a, a pair of walls 62b and 62c projected from the bottom portion 62a, and a pillar portion 62d provided between the walls 62b and 62c. The bottom portion 62a is a part which receives a pressure force from the elastic body 63, and is structured to be long in a predetermined direction (the top-to-bottom direction in FIG. 5). A recess 62e is formed in the bottom portion 62a at a part corresponding to a rotational position of the roller 61a so as not to prevent the rotation of the roller 61a. The walls 62b and 62c are opposed to each other with a gap greater than a width of the roller 61 (i.e., a dimension with respect to a hole axis direction of the through-hole). In the walls 62b and 62c, through-holes are formed near both ends of the bottom portion 62a in a longitudinal direction, respectively. The pillar portion 62d is provided to fill a space between the pair of walls 62b and 62c at one end side in the longitudinal direction of the bottom portion 62a (i.e., the lower end side in FIG. 5). In the pillar portion 62d, a through-hole is formed to be communicated with the through-holes of the walls 62b and 62c.

In the through-hole on the one end side of the support body 62 (i.e., the lower end side in FIG. 5), an axis member (hereinafter referred to as an arm shaft) 3a provided on the housing 3 is inserted. The arm shaft 3a is formed to have a diameter slightly smaller than that of the through-holes of the walls 62b and 62c. As a result, the support body 62 is structured to be swingable with respect to the housing 3 with the arm shaft 3a being a fulcrum. Meanwhile, in the through-hole on the other end side of the support body 62 (i.e., the upper end side in FIG. 5), the roller shaft 61b over which the roller 61a is provided is mounted. Note that retaining members (for example, E-rings) 61c and 3b for preventing elements from slipping out of the through-holes of the walls 62b and 62c are arranged on a distal end (an end portion on the opposite side of the head) of the roller shaft 61b and a distal end of the arm shaft 3a, respectively.

The support body 62 is positioned such that the shaft center of the roller 61a and the roller shaft 61b is substantially orthogonal to a shaft center of the elastic body 63 with the support body 62 being swingably supported on the arm shaft 3a. In other words, the arm shaft 3a is arranged on the housing so as to enable the positioning of the support body 62 in the above-described way. Consequently, the pressure force from the elastic body 63 acts on the roller 61a through the bottom portion 62a.

The elastic body 63 presses the rotor 61 against the drive gear 7 through the support body 62. More specifically, the elastic body 63 presses the roller 61a against the gear portion 7b which will be described later. In the present embodiment, although a spring (a helical spring) is applied as the elastic body 63 in one example, the form is not particularly limited as long as the adopted element can press the roller 61 against the gear portion 7b.

The elastic body 63 lies between a frame portion 3c of the housing 3 and the bottom portion 62a of the support body 62. In the frame portion 3c, an accommodation portion 3d which accommodates the elastic body 63 is formed. The accommodation portion 3d is a space capable of accommodating the elastic body 63, and is formed as a space of an arbitrary shape such as a columnar or prism-like shape. The elastic body 63 is accommodated in the accommodation portion 3d in a compressed state. Thus, the elastic body 63 constantly presses the roller 61a against the gear portion 7b through the bottom portion 62a.

As one example, in the present embodiment, the elastic body 63 is structured by including a first elastic body 63a, and a second elastic body 63b arranged concentric with the first elastic body 63a. That is, the elastic body 63 has a double spring structure constituted by the first elastic body 63a and the second elastic body 63b. By this structure, the elastic body 63 has enhanced pressure force on the gear portion 7b.

The elastic body 63 (the first elastic body 63a and the second elastic body 63b) can adjust the pressure force on the gear portion 7b by an adjustment portion 64. As one example, in the present embodiment, the adjustment portion 64 is structured by including a screw 64a and a plate 64b. The screw 64a is mounted on the frame portion 3c of the housing 3. In the frame portion 3c, a mounting hole 3e for insertion of the screw 64a is formed. The mounting hole 3e penetrates the frame portion 3c, and is communicated with the accommodation portion 3d. On the frame portion 3c, a nut 64c capable of fastening the screw 64a in accordance with the mounting hole 3e is fixed.

The screw 64a is advanced or retracted in a direction in which a length of the elastic body 63 is varied by being fastened with the nut 64c. When the screw 64a is to be advanced or retracted, a tool such as a driver is used. The plate 64b lies between the elastic body 63 and a bottom surface 3f of the accommodation portion 3d. Further, the plate 64b abuts on an end portion of the elastic body 63 in the direction in which the length of the elastic body 63 is varied, and also abuts on a distal end portion 64d of the screw 64a via the mounting hole 3e.

When the screw 64a is tightened to the nut 64c, the plate 64b is moved toward the elastic body 63. As a result, the elastic body 63 is compressed by being pressed against the bottom portion 62a of the support body 62 by the plate 64b. In this way, the pressure force of the elastic body 63 on the gear portion 7b can be increased. Conversely, when the screw 64a is loosened from the nut 64c, the plate 64b is retracted from the elastic body 63. As a result, pressure on the bottom portion 62a by the plate 64b is reduced, and the elastic body 63 extends. In this way, the pressure force of the elastic body 63 on the gear portion 7b can be reduced.

The drive gear 7 is a member which is rotated about axis S in conjunction with the operation (rotation) of the lever 2, as described above. The drive gear 7 has a form that two substantially cylindrical portions having different outside diameters are concentrically continuous. A smaller diameter cylindrical portion (hereinafter referred to as a proximal portion) 7a is a connecting part coupled to the base end portion 2c of the lever 2. The proximal portion 7a is supported on the housing 3 by a bearing 71. In this way, the drive gear 7 can be rotated about axis S with respect to the housing 3, together with the lever 2 coupled to the proximal portion 7a. A larger diameter cylindrical portion (hereinafter referred to as a gear portion) 7b is a portion which receives a load from the load applying portion 6. That is, a load from the load apply portion 6 affects the gear portion 7b.

As shown in FIG. 5, the drive gear 7 includes an uneven portion 72 at an outer periphery of the gear portion 7b. The uneven portion 72 is pressed by the roller 61a of the load applying portion 6. The force of pressurizing the uneven portion 72 by the roller 61a corresponds to a load applied to the lever 2 in the forward operation period and the reverse operation period (i.e., the force which suppresses the operation of the lever 2). More specifically, the uneven portion 72 is a part to which such suppressive power is input.

In the present embodiment, on the gear portion 7b, a first uneven portion 73 and a second uneven portion 74 are formed at the outer periphery. In the drive gear 7, the proximal portion 7a is supported on the housing 3 such that the first uneven portion 73 of the gear portion 7b is positioned on the stern side, and the second uneven portion 74 is positioned on the bow side.

The first uneven portion 73 contacts the roller 61a of the first load applying portion 6a to correspond to each of the neutral position, the forward position, and the reverse position of the lever 2. The second uneven portion 74 contacts the roller 61a of the second load applying portion 6b to correspond to the neutral position of the lever 2.

The first uneven portion 73 includes a recess corresponding to the neutral position (hereinafter referred to as a valley 73a), a recess corresponding to the forward position (hereinafter referred to as a valley 73b), and a recess corresponding to the reverse position (hereinafter referred to as a valley 73c). The valleys 73a, 73b, 73c are formed along a direction of axis S on the outer periphery of the gear portion 7b. The valley 73b and the valley 73c are arranged on opposed positions with the valley 73a interposed therebetween in a circumferential direction of the gear portion 7b. In the circumferential direction, a projection (hereinafter referred to as a raise 73d) is provided between the valley 73a and the valley 73b, and a projection (hereinafter referred to as a raise 73e) is provided between the valley 73a and the valley 73c. The two sides in the circumferential direction of the valley 73b and the valley 73c are contiguous with the outer periphery of the gear portion 7b.

In the present embodiment, the valleys 73a, 73b, 73c and the raises 73d and 73e form a symmetrical configuration with respect to the valley 73a in the circumferential direction (as an instance, a substantially wavy configuration). However, such a symmetrical configuration is not necessarily adopted, and an unsymmetrical configuration may be applied. For example, the valley 73c corresponding to the reverse position may be made deeper than the valley 73b corresponding to the forward position, in other words, the raise 73*e* may be made higher than the raise 73*d*.

The second uneven portion 74 includes a recess corresponding to the neutral position (hereinafter referred to as a valley 74*a*). On one side in a circumferential direction of the valley 74*a* (a reverse rotation side of the lever 2), a projection (hereinafter referred to as a raise 74*b*) is provided. The raise 74*b* is contiguous with the outer periphery of the gear portion 7*b*. Meanwhile, on the other side in the circumferential direction of the valley 74*a* (a normal rotation side of the lever 2), a valley bottom 74*c* of the valley 74*a* is continued circumferentially. As described above, in the present embodiment, in the second uneven portion 74, a step is formed circumferentially from the valley 74*a*. The depth of the valley 74*a* is made the same as the depths of the valleys 73*a*, 73*b*, 73*c*. The height of the raise 74*b* is made the same as the heights of the raises 73*d* and 73*e*. However, the heights and the depths may be made different from each other.

Figure 6:
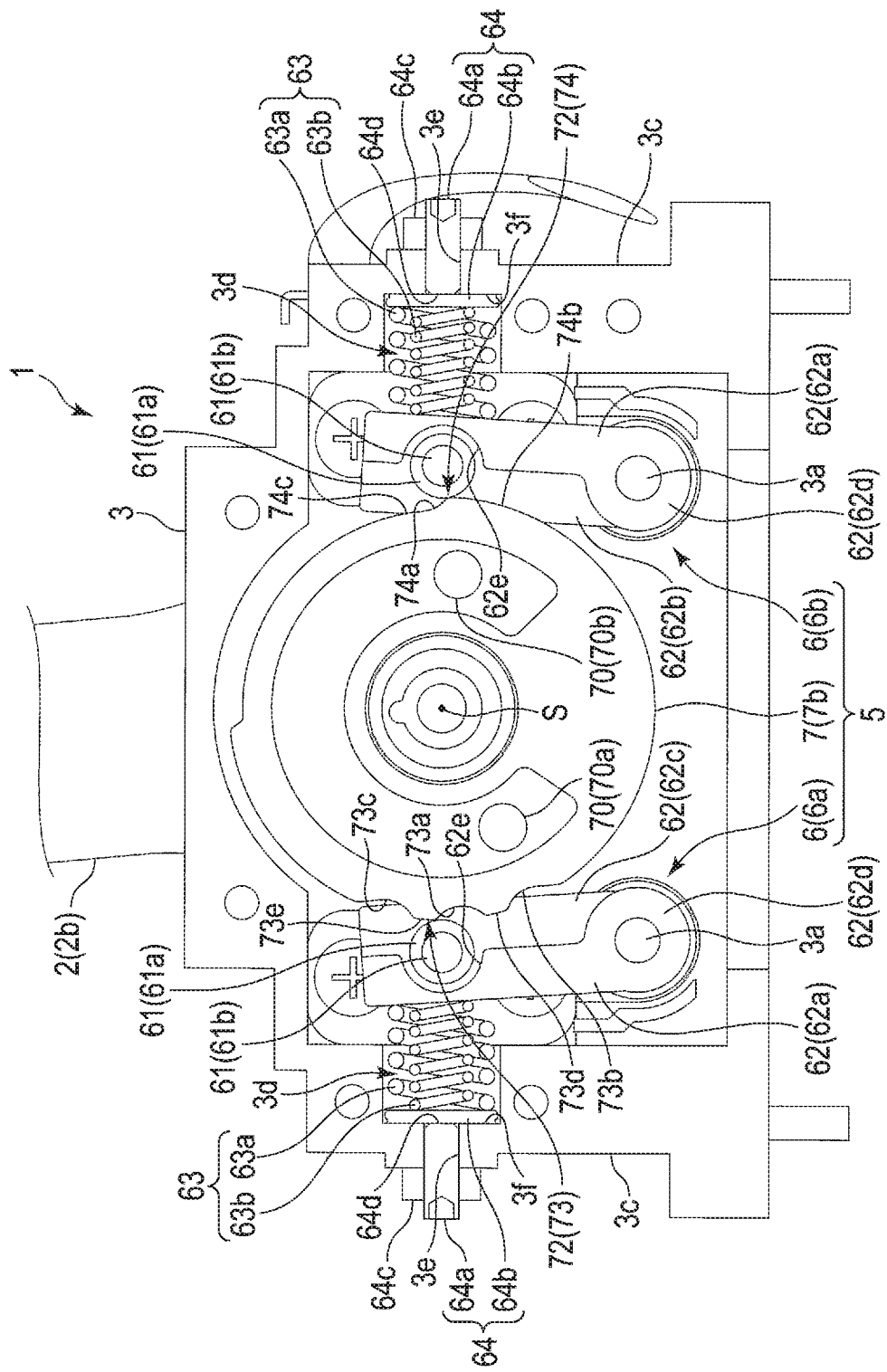
FIG. 6 is a view showing the state of the lever operation suppression mechanism in a second operation period (a reverse operation period) of the lever in the shift device according to one embodiment of the present invention.
Figure 7:
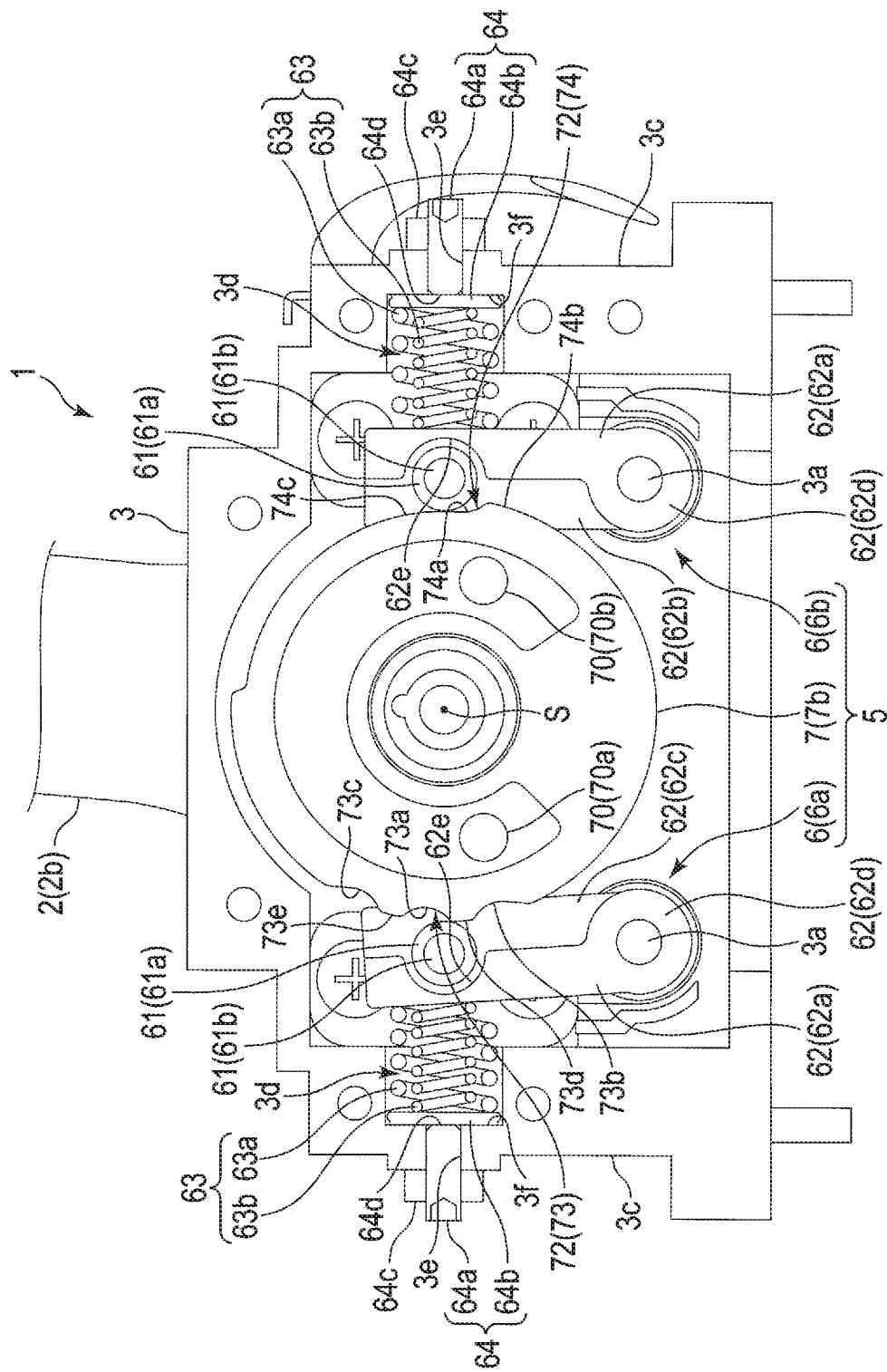
FIG. 7 is a view showing the state of the lever operation suppression mechanism in a first operation period (a forward operation period) of the lever in the shift device according to one embodiment of the present invention.

An action of the lever operation suppression mechanism 5 when the lever 2 is operated for shifting will be described with reference to FIGS. 5 to 7. FIG. 5 shows the state of the lever operation suppression mechanism 5 when the lever 2 is placed at the neutral position. FIG. 6 shows the state of the lever operation suppression mechanism 5 in the reverse operation period of the lever 2 (in the operation period of the lever 2 between the neutral position and the reverse position). FIG. 7 shows the state of the lever operation suppression mechanism 5 in the forward operation period of the lever 2 (in the operation period of the lever 2 between the neutral position and the forward position).

As shown in FIG. 5, in a state in which the lever 2 is placed in the neutral position, the roller 61*a* of the first load applying portion 6*a* contacts the valley 73*a* of the first uneven portion 73, and the roller 61*a* of the second load applying portion 6*b* contacts the valley 74*a* of the second uneven portion 74. At this time, these rollers 61*a* press the valleys 73*a* and 74*a*, respectively, in receipt of pressure force from the corresponding elastic bodies 63 (the first elastic body 63*a* and the second elastic body 63*b*).

When the outboard motor 10 is shifted from Neutral (N) to Reverse (R), the lever 2 is rotated in a direction indicated by arrow AR (i.e., reverse rotation about axis S) from the neutral position shown in FIG. 5. At this time, the roller 61*a* of the first load applying portion 6*a* climbs up on the raise 73*e* along the valley 73*a* while rotating about the roller shaft 61*b* with respect to the support body 62, as shown in FIG. 6. Here, a ridge portion of the raise 73*e* makes a force opposite to the pressure force from the elastic body 63 (631) (hereinafter referred to as a first reaction force) act on the roller 61*a*. When the roller 61*a* receives the first reaction force, the support body 62 of the first load applying portion 6*a* swings toward the elastic body 63 (631) with the arm shaft 3*a* being the fulcrum. Simultaneously with the above, the roller 61*a* is also displaced toward the elastic body 63 (631) together with the support body 62. Consequently, the elastic body 63 (631) is compressed.

Similarly, when the lever 2 is rotated in the direction of reverse rotation from the neutral position, the roller 61*a* of the second load applying portion 6*b* climbs up the raise 74*b* along the valley 74*a* while rotating about the roller shaft 61*b* with respect to the support body 62, as shown in FIG. 6. Here, a ridge portion of the raise 74*b* makes a force opposite to the pressure force from the elastic body 63 (632) (hereinafter referred to as a second reaction force) act on the roller 61*a*. When the roller 61*a* receives the second reaction force, the support body 62 of the second load applying portion 6*b* swings toward the elastic body 63 (632) with the arm shaft 3*a* being the fulcrum. Simultaneously with the above, the roller 61*a* is displaced toward the elastic body 63 (632) together with the support body 62. Consequently, the elastic body 63 (632) is compressed.

The swing of the support bodies 62 and the displacement of the first rollers 61*a* by the first reaction force and the second reaction force as described above are performed against the pressure force of the elastic bodies 63. Accordingly, the swing and displacement are transmitted to the lever 2 as a steering feel via the first uneven portion 73 and the second uneven portion 74 of the gear portion 7*b*, in other words, the drive gear 7. That is, in the reverse operation period of the lever 2, loads applied to the drive gear 7 from the first load applying portion 6*a* and the second load applying portion 6*b*, respectively, are increased by the amount of compression of the corresponding elastic bodies 63. As a result, it is possible to make the operator operating the lever 2 recognize that the reverse operation is being performed as a steering feel.

Note that when the outboard motor 10 is to be shifted from Reverse (R) to Neutral (N), the lever 2 is operated in the direction of normal rotation about axis S from the reverse position so that the lever 2 is returned to the neutral position. At this time, the swing of the support bodies 62 and the displacement of the rollers 61*a* occur opposite to those in the above-described reverse operation period in such a way as to be against the pressure force of each elastic body 63. Accordingly, it is possible to make the operator operating the lever 2 recognize that the reverse operation (shifting from reverse to neutral) is being performed as a similar steering feel.

In contrast, when the outboard motor 10 is shifted from Neutral (N) to Forward (F), the lever 2 is rotated in a direction indicated by arrow AF (i.e., normal rotation about axis S) from the neutral position shown in FIG. 5. At this time, the roller 61*a* of the first load applying portion 6*a* climbs up on the raise 73*d* along the valley 73*a* while rotating about the roller shaft 61*b* with respect to the support body 62, as shown in FIG. 7. Here, a ridge portion of the raise 73*d* makes a force opposite to the pressure force from the elastic body 63 (631) (hereinafter referred to as a third reaction force) act on the roller 61*a*. When the roller 61*a* receives the third reaction force, the support body 62 of the first load applying portion 6*a* swings toward the elastic body 63 (631) with the arm shaft 3*a* being the fulcrum. Simultaneously with the above, the roller 61*a* is also displaced toward the elastic body 63 (631) together with the support body 62. Consequently, the elastic body 63 (631) is compressed. Note that because the raises 73*d* and 73*e* form a symmetrical configuration with respect to the valley 73*a* in the circumferential direction, the third reaction force is the same as the first reaction force in the magnitude and the direction.

Meanwhile, when the lever 2 is rotated in the direction of normal rotation from the neutral position, the roller 61*a* of the second load applying portion 6*b* rotates on the valley bottom 74*c* of the valley 74*a* while rotating about the roller shaft 61*b* with respect to the support body 62, as shown in FIG. 7. Accordingly, a force opposite to the pressure force from the elastic body 63 (632) such as the second reaction force does not act on the roller 61*a*. Accordingly, the support body 62 of the second load applying portion 6*b* does not swing toward the elastic body 63 (632) with the arm shaft 3*a* being the fulcrum, and is maintained in the same state as that in which the lever 2 is placed at the neutral position (i.e., the state shown in FIG. 5). Further, the roller 61*a* is also not displaced toward the elastic body 63 (632), and is maintained in the same state as that in which the lever 2 is placed at the neutral position (i.e., the state shown in FIG. 5).

The swing of the support body 62 and the displacement of the roller 61a by the third reaction force are performed against the pressure force of the elastic body 63, and are transmitted to the lever 2 as a steering feel via the first uneven portion 73 of the gear portion 7b. As a result, it is possible to make the operator operating the lever 2 recognize that the forward operation is being performed as a steering feel. However, in the forward operation period of the lever 2, only the load applied to the drive gear 7 from the first load applying portion 6a is increased, and a load applied from the second load applying portion 6b does not change.

Note that when the outboard motor 10 is to be shifted from Forward (F) to Neutral (N), the lever 2 is operated in the direction of reverse rotation about axis S from the forward position so that the lever 2 is returned to the neutral position. At this time, the swing of the support body 62 and the displacement of the roller 61a occur opposite to those in the above-described forward operation period in such a way as to be against the pressure force of the elastic body 63. Accordingly, it is possible to make the operator operating the lever 2 recognize that the forward operation (shifting from forward to neutral) is being performed as a similar steering feel.

As described above, according to the first load applying portion 6a and the second load applying portion 6b, in both of the forward operation period and the reverse operation period of the lever 2, a load (detent force) applied to the lever 2 via the drive gear 7 can be increased. Here, in the forward operation period of the lever 2, only the load applied to the lever 2 from the first load applying portion 6a is increased. In contrast, in the reverse operation period of the lever 2, load applied to the lever 2 from not only the first load applying portion 6a but also the second load applying portion 6b is increased. Accordingly, in the reverse operation period of the lever 2, load greater than that of the forward operation period can be applied to the lever 2. The load applied to the lever 2 contributes to force acting as the suppressive power (operation resistance) in operating the lever 2. Accordingly, as compared to the forward operation period of the lever 2, the operation of the lever 2 can be more suppressed in the reverse operation period.

Consequently, in operating the lever 2 from the forward position to the neutral position, for example, it is possible to prevent a situation where the lever 2 is operated far to the reverse position abruptly beyond the neutral position by the inertia from being brought about. Accordingly, it is possible to prevent a clutch of a forward/reverse gear from being actuated abruptly in the shift actuator 13 despite the state where the number of revolutions of the gear of the propeller shaft 15 is high in the outboard motor 10, for example. As a result, it is possible to prevent breaking, etc., of a gear mechanism.

Meanwhile, the first load applying portion 6a and the second load applying portion 6b do not disable the operation of the lever 2 in the forward operation period and the reverse operation period. Thus, it is possible to directly operate the lever 2 from the neutral position to the forward position or the reverse position without performing an unlocking operation, for example. In addition, there is no need to provide mechanisms such as a lock mechanism and a braking mechanism inside the lever 2, so that the size of the lever 2, and the shift device 1 as a whole, can be reduced.

Also, as described above, a load (decent force) greater than that applied in the forward operation period can be applied to the lever 2 in the reverse operation period. Accordingly, it is possible to make the operator operating the lever 2 have a stronger steering feel that the reverse operation is being performed as compared to that recognized at the time of the forward operation. Thus, it is possible to effectively prevent the lever 2 from being operated abruptly from the forward position to the reverse position passing through the neutral position, for example, by the operator by mistake.

Further, the first load applying portion 6a and the second load applying portion 6b each have the adjustment portion 64. Accordingly, the pressure force (compression) of the elastic body (the first elastic body 63a and the second elastic body 63b) can be adjusted. More specifically, the load applied to the lever 2 via the drive gear 7, in other words, the suppressive power (operation resistance) in operating the lever 2 can be adjusted. In this way, it is possible to constantly keep the suppressive power in operating the lever 2 appropriate without affecting the operability of the lever 2.

In addition, the first load applying portion 6a and the second load applying portion 6b are arranged symmetric with respect to axis S. Accordingly, an offset load does not need to be applied to axis X (more specifically, the drive gear 7). Consequently, it becomes possible to suppress a trouble caused by the offset load, for example, unstableness of the lever 2 when operating the lever 2.

While the present invention has been described based on one embodiment as shown in FIGS. 1 to 7, the above-described embodiment has been presented by way of example only, and is not intended to limit the scope of the present invention. Accordingly, it is obvious to a person skilled in the art that the present invention can be realized in a modified form without departing from the spirit of the present invention, and accompanying claims and their equivalents are intended to cover such forms or modifications as would fall within the scope and spirit of the invention.

For example, in the above-described embodiment, a case of the shift device 1 in which the lever 2 forms a pair (i.e., a double structure) has been described. Alternatively, even in a case of a shift device having a single lever (i.e., a single structure) or a shift device having three or more levers, by adapting the lever operation suppression mechanism to each lever, the operation of the corresponding lever can be suppressed similarly.

What is claimed is:

1. A shift device for a boat for performing a shifting operation of an outboard motor, the shift device comprising:
   a lever operable about a predetermined axis; and
   a lever operation suppression mechanism which suppresses an operation of the lever, wherein
   the lever operation suppression mechanism includes a load applying portion which applies different loads to the lever in a first operation period of operating the lever between a neutral position of the lever and a first position corresponding to a forward movement of the boat, and in a second operation period of operating the lever between the neutral position and a second position corresponding to a backward movement of the boat.

2. The shift device of claim 1, wherein the load applying portion includes:
   a first load applying portion which applies a load to the lever in the first operation period and the second operation period; and
   a second load applying portion which applies a load to the lever in the second operation period.

3. The shift device of claim 2, wherein the lever operation suppression mechanism includes:
  a drive gear which rotates about the predetermined axis in conjunction with the operation of the lever; and
  a housing which rotatably supports the drive gear,
  the first load applying portion and the second load applying portion each include a rotor which contacts the drive gear and rotates together with the drive gear, a support body which rotatably holds the rotor, and is swingably supported on the housing, and an elastic body which presses the rotor against the drive gear via the support body, and
  the drive gear includes a first uneven portion which contacts the rotor of the first load applying portion in the first operation period and the second operation period of the lever, and a second uneven portion which contacts the rotor of the second load applying portion in the second operation period.

4. The shift device of claim 3, wherein the first load applying portion and the second load applying portion each include an adjustment portion which adjusts a pressure force of the elastic body.

5. The shift device of claim 4, wherein the adjustment portion includes:
  a screw which is advanced or retracted in a direction in which a length of the elastic body is varied; and
  a plate interposed between an end portion of the elastic body in the direction in which the length of the elastic body is varied and a distal end portion of the screw.

6. The shift device of claim 5, wherein each of the elastic body of the first load applying portion and the elastic body of the second load applying portion includes a first elastic body and a second elastic body arranged concentric with the first elastic body.

7. The shift device of claim 4, wherein each of the elastic body of the first load applying portion and the elastic body of the second load applying portion includes a first elastic body and a second elastic body arranged concentric with the first elastic body.

8. The shift device of claim 3, wherein each of the elastic body of the first load applying portion and the elastic body of the second load applying portion includes a first elastic body and a second elastic body arranged concentric with the first elastic body.

9. The shift device of claim 2, wherein the first load applying portion and the second load applying portion are arranged symmetric with respect to the predetermined axis.

* * * * *